United States Patent [19]

Ota et al.

[11] Patent Number: 4,481,163

[45] Date of Patent: Nov. 6, 1984

[54] METHOD OF MANUFACTURING A BOTTLE-SHAPED CONTAINER OF SYNTHETIC RESIN HAVING GROUND SURFACE

[75] Inventors: Akiho Ota, Funabashi; Fumio Negishi, Tokyo, both of Japan

[73] Assignee: Yoshino Kogyosho Co., Ltd., Tokyo, Japan

[21] Appl. No.: 546,077

[22] Filed: Oct. 28, 1983

Related U.S. Application Data

[60] Continuation of Ser. No. 350,882, Feb. 22, 1982, , which is a division of Ser. No. 106,857, Dec. 26, 1979, abandoned.

[30] Foreign Application Priority Data

| Jan. 26, 1979 [JP] | Japan | 54-9178 |
| Jan. 26, 1979 [JP] | Japan | 54-8446 |
| Jan. 26, 1979 [JP] | Japan | 54-8447 |

[51] Int. Cl.³ .............. B29C 17/07; B29C 17/12; B29D 9/04
[52] U.S. Cl. ................... 264/513; 215/1 C; 264/521; 264/532; 264/535; 264/537; 264/162
[58] Field of Search .............. 264/509, 512, 513, 515, 264/521, 523, 532, 535, 537, 538, 540, 162; 215/1 C

[56] References Cited

U.S. PATENT DOCUMENTS

| 2,669,752 | 2/1954 | Pratt | 264/540 |
| 3,221,086 | 11/1965 | Wells | 264/526 X |
| 3,288,318 | 11/1966 | Corbin et al. | 215/1 C X |
| 3,379,559 | 4/1968 | Gerhardt | 215/1 C |
| 4,024,975 | 5/1977 | Uhlig | 215/1 C |
| 4,039,641 | 8/1977 | Collins | 264/535 X |
| 4,108,937 | 8/1978 | Martineu et al. | 264/535 X |
| 4,164,298 | 8/1979 | Nishikawa et al. | 215/1 C |
| 4,264,558 | 4/1981 | Jacobsen | 264/523 |
| 4,358,491 | 11/1982 | Ota et al. | 264/521 X |

FOREIGN PATENT DOCUMENTS

| 50-83478 | 7/1975 | Japan | 264/162 |
| 50-83481 | 7/1975 | Japan | 264/162 |

Primary Examiner—Jan H. Silbaugh
Attorney, Agent, or Firm—Parkhurst & Oliff

[57] ABSTRACT

A bottle-shaped container of saturated polyester having frosted or ground surface is manufactured by the steps of heating the outer layer portion of the injection-molded preformed piece to thereby crystallize the outer layer portion to opacify in white, and blow-molding the preformed piece in a blowing mold having at least part of its inner surface formed with rough surface sand-blasted in advance to thereby form the rough surface on the bottle-shaped container on the crystallized outer layer portion surface. Thus, the bottle-shaped container incorporates pearl-like ground surface desired in a shape on the surface instead of the glossy surface peculiar to synthetic resin.

4 Claims, 8 Drawing Figures

METHOD OF MANUFACTURING A BOTTLE-SHAPED CONTAINER OF SYNTHETIC RESIN HAVING GROUND SURFACE

This is a continuation of application Ser. No. 350,822 filed Feb. 22, 1982 which in turn is a division of U.S. Ser. No. 106,857 filed Dec. 26, 1979 which is now abandoned.

BACKGROUND OF THE INVENTION

This invention relates to a bottle-shaped container of synthetic resin such as saturated polyester having a ground surface like frosted glass and, more particularly, to a bottle-shaped container of synthetic resin such as saturated polyester incorporating rough surface as frosted glass instead of glossy surface peculiar to synthetic resin and a method of manufacturing the same.

A synthetic resin bottle molded by biaxially oriented blowing process has, since it incorporates various superior mechanical properties such as strength, a wide range of applications in the field of containers for liquid flavoring materials and cosmetics. Inasmuch as the bottle itself is, however, transparent or translucent and accommodates a mirror surface to the touch, it has such disadvantages that it imparts to a user a chilly sense of toughness and makes it difficult to express soft elegance.

A synthetic resin bottle which has coated on its surface a matte coating to form a frosted surface has been proposed. Since such a matte-surface bottle is, however, coated merely by the matte coating on the synthetic resin surface of smooth gloss, the coating easily tends to be separated due to the friction with other articles resulting in partial exposure of the original resin color. Such a bottle cannot have a frosted external appearance of deep outlook, a further disadvantage.

It has also been tried as means for opacifying the outer or surface layer portion of a transparent saturated polyester bottle in white or milky white the utilization of the whitening phenomenon due to the crystallization of the polyester in the saturated polyester bottle and a method of manufacturing the same. However such means merely opacifies the smooth surface of the bottle in white or milky white, but cannot obtain the so-called frosted or ground rough surface on the bottle, resulting in a deteriorated decorative effect on the bottle.

SUMMARY OF THE INVENTION

The present invention provides a saturated polyester bottle-shaped container which incorporates a frosted or ground surface that is entirely the same in external appearance and the sense of touch as frosted or ground glass in such a manner that it accommodates deep ground outlook and does not partially expose resin color even if subjected to friction from other articles by means of mutual effects of the whitening phenomenon of saturated polyester and thin matte coating coated on the surface thereof. Further, the present invention also provides a saturated polyester bottle-shaped container which incorporates a ground surface that is entirely the same in whitened state and irregular light reflectivity as ground glass and has a pearl-like gloss that can be readily obtained by ordinary blow-molding means and a method of manufacturing the same. Moreover, the present invention also provides a method of manufacturing a synthetic resin bottle-shaped container having a frosted or ground surface like ground glass that incorporates the same mechanical properties such as strength imparted by a biaxial orientation process as and soft elegance together with rough sense of touch, which method can readily fabricate such a bottle-shaped container.

Accordingly, an object of the present invention is to provide a synthetic resin bottle-shaped container which incorporates a matte rough surface like frosted or ground glass instead of the glossy surface peculiar to synthetic resin such as saturated polyester while employing the saturated polyester.

Another object of the present invention is to provide a synthetic resin bottle-shaped container which incorporates entirely the same external appearance and sense of touch as frosted or ground glass on the surface thereof to form a deep color tone by means of milky white opacity from the whitening phenomenon of crystallization at the outer layer of saturated polyester on the surface thereof and the color tone of matte coating coated on the surface together with the irregular reflection of light rays on the rough surface of the matte coating.

Yet another object of the present invention is to provide a synthetic resin bottle-shaped container which does not allow partial separation of matte coating coated on the surface thereof due to the presence of milky white opacity from the whitening phenomenon even if partially separated.

A further object of the present invention is to provide a synthetic resin bottle-shaped container which incorporates pearl-like gloss on a desired surface thereof without addition of any material for presenting a pearl-like gloss instead of the glossy surface peculiar to synthetic resin to form a superior light irregularly reflective rough surface together with an entirely new decorative effect without losing any advantageous properties of synthetic resin.

Still further object of the present invention is to provide a method of manufacturing a synthetic resin bottle-shaped container incorporating the aforementioned properties, which method can mold by entirely the same steps and productivity as the ordinary blow molding process sanitarily without the necessity of any foreign material and present pearl-like gloss together with high productivity of blow molding process.

Still another object of the present invention is to provide a method of manufacturing a synthetic resin bottle-shaped container having a frosted or ground pattern on the surface thereof only partially, which method can be economically carried out by masking at sandblasting step.

Still another object of the invention is to provide a method of manufacturing a synthetic resin bottle-shaped container having soft and warm sense of touch together with frosted or ground glass-like elegance, which method can readily form the bottle-shaped container by adding very simple step of sandblasting a preformed piece to the conventional method of manufacturing the bottle-shaped container.

BRIEF DESCRIPTION OF THE DRAWINGS

The above and other relates objects and features of the invention will be apparent from a reading of the following description of the disclosure found in the accompanying drawings and the novelty thereof pointed out in the appended claims.

DETAILED DESCRIPTION OF THE PREFERRED EMBODIMENTS

Figure 1:
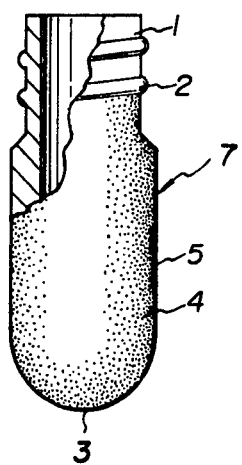
FIG. 1 is a front elevational view partly in fragmentary section of a preformed piece sandblasted on its surface to be blow-molded into a bottle-shaped container of this invention.

Referring now to the drawings, particularly to FIGS. 1 to 4 showing preformed piece to be blow-molded into a bottle-shaped container to this invention and the mold for blow-molding the piece into the bottle-shaped container, wherein like reference numerals designate the same parts in the following views, preferred bottle-shaped container and a method of manufacturing the same will be described in the case employing saturated polyester as synthetic resin material. However general thermoplastic synthetic resin can also be employed as the material therefor and the saturated polyester is used merely by way of illustration only.

It is noted that, in the case employing saturated polyester, its intrinsic viscosity should be higher than 0.55 such as with polyethylene terephthalate or the like, to form a preformed piece by means of injection molding the piece from extruded or injection-molded parison.

This preformed piece, as shown in FIG. 1, consists of a neck end portion 1, threads 2 formed on the neck portion 1 for screwing a threaded cap therewith, and a cylindrical portion 4 integrally formed from the neck portion 1 with a round bottom 3 at the other end thereof. The neck portion 1 and the threads 2 are so formed as to be the same in shape as those of a bottle-shaped container finally blow-molded. It is noted the preformed piece may, of course, be colored in any desired color tone.

Figure 3:
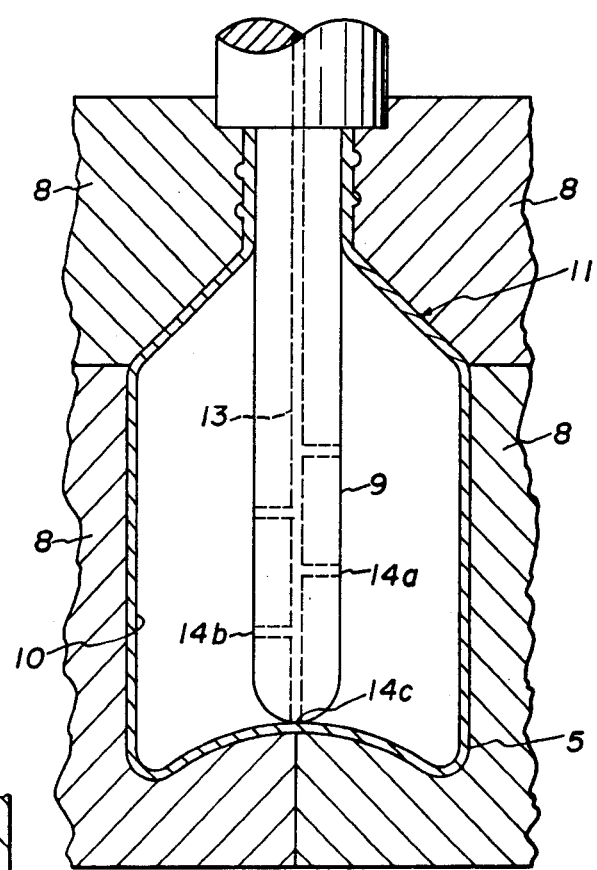
FIG. 3 is a vertical sectional view of the mold for blow-molding the preformed piece shown in FIG. 1 into a bottle-shaped container.
Figure 2:
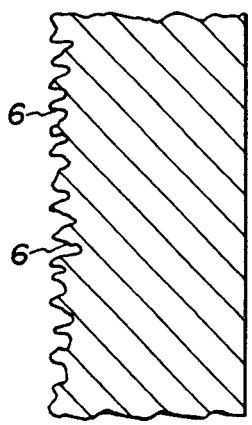
FIG. 2 is a partially enlarged sectional view of the wall of the preformed piece shown in FIG. 1.
Figure 4:
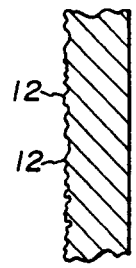
FIG. 4 is a partially enlarged sectional view of the wall of the bottle-shaped container of this invention.

The bottle-shaped container of this invention having a frosted or ground surface is obtained from the preformed piece described above by the steps of blasting sand particles together with compressed air toward the outer peripheral wall surface 5, excluding the neck portion 1, of the cylindrical portion 4 with the round bottom 3 of the saturated polyester preformed piece 7. The piece is thereby sandblasted at its peripheral wall surface 5 so as to form numerous fine rugged ground surfaces 6 on the entire peripheral wall surface 5 of the preformed piece 7 as shown in enlarged size in cross section in FIG. 2. This is followed by setting or inserting the preformed piece 7 thus formed in or into a blow-molding mold 8 having a cavity of smooth inner wall surface 10 as shown in FIG. 3, and biaxially blow-orienting the preformed piece 7 and heat-setting it as desired into a bottle-shaped container.

It is noted that, although the preformed piece 7 shown in FIG. 1 is sandblasted on the entire body surface excluding the neck portion, it may also be sandblasted partially and in patterns on the body surface.

Figure 5:
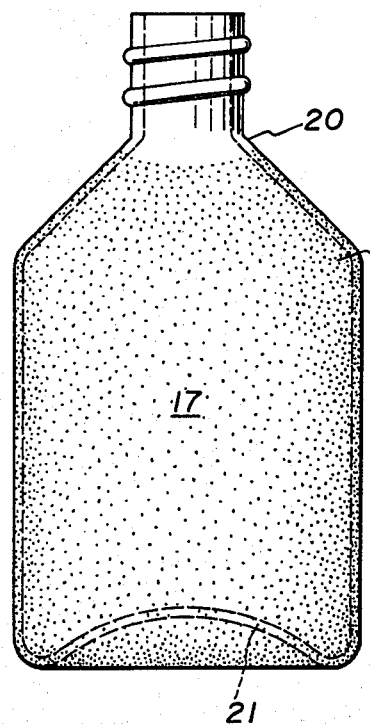
FIG. 5 is a front elevational view of one preferred embodiment of the bottle-shaped container of this invention.
Figure 6:
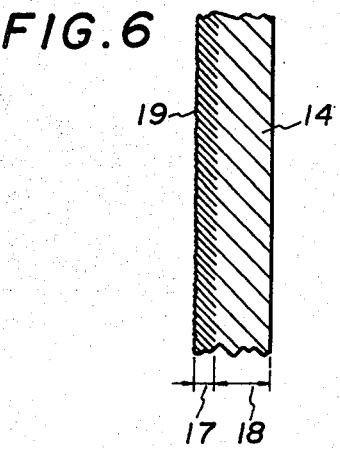
FIG. 6 is a partially enlarged sectional view of the wall of the bottle-shaped container shown in FIG. 5.

As shown in FIG. 5, the bottle-shaped container body 15 thus blow-molded as previously described is thermally crystallized highly at the outer layer portion 17 of the wall 16 to be opacified in white or milky white as compared with the transparent inner layer portion 18 of the wall 16 as shown in FIG. 6.

The outer layer portion 17 of the wall 16 of the bottle-shaped container body 15 is thus formed with numerous fine rugged ground surfaces 19 as previously sandblasted on the preformed piece. Thus, the bottle-shaped container body 15 presents pearl-like gloss on the surface 19 entirely without the glossy surface peculiar to smooth synthetic resin surface by means of the irregular reflection of light rays on the rough ground surface 19 and the color tone of the translucent whitened outer layer portion 17 of the wall 16 thereof due to the whitening phenomenon from the crystallization of the outer layer portion 17.

Figure 7:
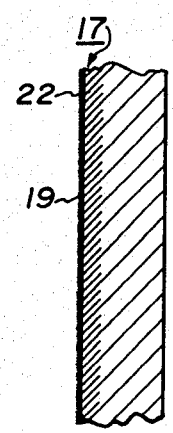
FIG. 7 is a partially enlarged sectional view similar to FIG. 6 but showing another preferred embodiment.

In FIGS. 5 and 7, the bottle-shaped container body 15 of saturated polyester is thermally crystallized to be whitened or blushed and is thus opacified in white or milky white color tone on the entire outer layer portion 17 from the shoulder portion 20 to the bottom 21 thereof, and is then coated with thin matte coating 22 on the surface 19 thereof so as not to fairly disturb the transmission of the light rays through the coating 22.

It is known that the saturated polyester is subjected to crystallization resulting in blushing or whitening when retained at high temperature of the ranges from glass softening point to crystallization temperature for predetermined period, and the temperature is selected from the temperature ranges from the temperature below 20° C. from the melting point to the crystallization temperature.

The temperature and heating period are so selected, for example, when the preformed piece is blow-molded into a bottle-shaped container, as to white or blush the outer layer portion to a depth of approx. 1 mm in case of the preformed piece or parison having a wall of thickness of 2 to 10 mm of saturated polyester and to crystallize the outer layer portion having mean density of the polymer of the ranges from 1.345 to 1.375.

The bottle-shaped container body 15 of this invention is subjected to the above whitening phenomenon, and is opacified in milky white in the outer layer portion 17 from the shoulder 20 to the bottom 21 thereof. When the saturated polyester is colored in the bottle-shaped container body 15, it is presented in a mixed color tone of the color and milky white.

The bottle-shaped container body of this invention is coated with matte coating 22 on the surface as previously described, and this matte coating may include, for example, a mixture of approx. 70% pigment of necessary color per total coating within a great deal of solvent having low boiling point and a slight amount of fine powder of silicon oxide, and is so sprayed thinly on the surface of the bottle-shaped container body 15 thus blushed or whitened as not to disturb the transmission of light rays therethrough, to thereby form a coating 22. This coating 22 thus forms a rough surface of numerous fine rugged assembly from the presence of the fine powder of the inorganic pigment and silicon oxide and abrupt volatilization of the low boiling point solvent to thereby form a complete matte coating. It is noted that the color tone of the pigment in the coating may be the same as or different from that of the colored saturated polyester of the bottle-shaped container body 15, but may preferably be the same.

It is also noted that, although the preferred embodiment of the bottle-shaped container body 15 shown in FIG. 5 is formed with the ground surface entirely from the shoulder 20 to the bottom 21 thereof, it may partially be formed.

It should be understood from the foregoing description that since the bottle-shaped container body of this invention is crystallized to be blushed or whitened to be opacified in white or milky white in the outer layer portion thereof of saturated polyester and so coated with thin matte coating on the surface of the outer layer portion thereof as not to fairly disturb the transmission of light rays therethrough, it can form a deep color tone by means of the milky white produced by the whitening phenomenon and the color tone of the coating and can also form a frosted or ground surface in external appearance and sense of touch by means of the light rays' irregular reflection on the rough surface of the matte coating.

It should also be appreciated that since the outer layer portion of the bottle-shaped container body of this invention of saturated polyester is opacified in white or milky white due to the whitening phenomenon, it does not emphasize the partial separation of the matte coating due to the presence of the milky white even if the coating is partially separated, which effect is particularly remarkable when the bottle-shaped container body is formed with colored saturated polyester and coated with matte coating of the same color tone as that of the polyester.

Referring back to FIGS. 1 through 4, the preformed piece 7 is blow-molded into the bottle-shaped container by the method of manufacturing the bottle-shaped container as will be described in detail below.

When the preformed piece 7 is set in a blow-molding mold to biaxially orient and heat-set it, it is necessary to heat the preformed piece 7 to be set or inserted in or into the mold at the orientation temperature in the ranges from the glass transition temperature of saturated polyester forming the preformed piece to the melting point thereof and also to heat the blow-molding mold similarly at the heat-setting temperature in the ranges from the glass transition temperature of saturated polyester to the crystallization temperature thereof. That is, the preformed piece 7 must be heated within a heating chamber at the orientation temperature in the ranges of the glass transition temperature of saturated polyester forming the preformed piece 7 to the melting point capable of performing molecular orientation, preferably 70° to 220° C. immediately before setting the preformed piece 7 in the blow-molding mold for the biaxial orientation and heat setting thereof.

The bottle-shaped container of this invention is manufactured by the steps of setting the preformed piece 7 heated to the aforementioned predetermined temperature in a blow-molding mold 8 shown in FIG. 3, blowing compressed air internally into the mold 8 to expand the preformed piece 7 and simultaneously to push down the bottom 3 of the preformed piece 7 by a push rod 9 so as to biaxially orient the preformed piece 7 as shown in FIG. 3 until the outer peripheral wall surface 5 of the piece 7 makes contact with the smooth inner wall surface 10 of the mold 8. This is followed by heat-setting the preformed piece 7 when the outer peripheral wall surface of the piece 7 thus expanded makes contact with the smooth inner wall surface of the mold 8 heated to the aforementioned predetermined temperature. There is thus formed a bottle-shaped container 11 of predetermined shape having extremely fine and flattened rugged ground surface 12, as exemplifed in FIG. 4, on the outer peripheral wall surface 5 thereof.

The above heat setting step after the biaxially orienting step is to remove the strains occuring in the bottle-shaped container in the biaxially orienting step prior to the heat setting step.

The blow-molding mold for heat-setting the bottle-shaped container for the purpose of performing this object should be heated to the temperature in the ranges from the glass transition temperature of the thermoplastic synthetic resin to the melting point which is apprehended to disturb the molecular orientation formed in the biaxially orienting step in the bottle-shaped container. However such a heat-setting step is not always necessary after the biaxially orienting step in the blow-molding mold. For example, with a bottle-shaped container for holding cosmetics, which container is not so necessarily thermally stabilized, the mold is not so positively heated when the bottle-shaped container is not heat-set.

It is preferred to cool the bottle-shaped container 11 immediately after completing the aforementioned biaxially orienting and heat-setting steps, to then prevent the bottle-shaped container 11 from thermally deforming at its unloading time from the mold, and to unload the bottle-shaped container 11 from the mold 8.

In order to heat and cool the mold, there are, for example, provided a heat source and at least one passage perforated to introduce coolant or the like in the mold. When the mold is heated to predetermined heat-setting temperature, the introduction of the coolant through the passage is stopped and the heat source is energized. When the mold is cooled after the heat-setting step, the heat source is deenergized and the coolant is introduced through the passage in the mold. Accordingly, the bottle-shaped container thus heat-set can be cooled by cooling the mold or by blowing cooling air directly into the bottle-shaped container set in the mold.

In the blow-molding mold 8 exemplified according to the present invention shown in FIG. 3, the push rod 9 is perforated with a hole or passage 13 for introducing compressed air on the axis thereof and with branch holes or passages 14a, 14b, 14c integrally communicated with the passage 13 at the sides and bottom thereof. Thus it can utilize the push rod 9 itself for introducing the compressed air for expanding the bottle-shaped container in the mold 8 so as to biaxially orient simultaneously the preformed piece set in the mold 8. It is noted that the preformed piece may also be sequentially biaxially oriented by means of a sequentially biaxially orienting process which has the steps of pushing down the push rod prior to the blowing step of the compressed air into the preformed piece set in the mold to expand the preformed piece so as to uniaxially orient the preformed piece along the axis of the piece and then blowing the compressed air into the preformed piece to radially orient the preformed piece already axially oriented.

In case that saturated polyester is used as thermoplastic synthetic resin as exemplified in the preformed piece in FIG. 1, when the preformed piece injection-molded is subsequently annealed in the step of injection-molding the preformed piece, it is significatly crystallized to thereby cause a whitening phenomenon resulting in deteriorated transparency of the preformed piece. When the mold for biaxially orienting and heat-setting the preformed piece is further heated higher than the orienting temperature, the bottle-shaped container is also whitened or blushed to cause the bottle-shaped container to lose its transparency. Since both of these facts cause difficulty in formation of beautiful frosted or ground surface on the bottle-shaped container, it is preferred to rapidly cool the preformed piece subsequently to the injection molding process of the preformed piece in the step of injection-molding the preformed piece and also to heat the mold for biaxially orienting and subsequently heat-setting as required the bottle-shaped container lower than the orienting temperature.

In order to further impart desired stability in size of the bottle-shaped container in the step of heat-setting the same at the aforementioned temperature lower than the orienting temperature, it is preferred to heat-set or make the outer wall surface of the preformed piece thus expanded closely contact the inner wall surface of the blow-molding mold for at least 5 seconds. If the preformed piece thus expanded makes instantaneous contact with the inner wall surface of the mold shorter than 5 seconds, the strain or deformation of the bottle-shaped container cannot be sufficiently removed.

It should be understood from the foregoing description that since the method of manufacturing the bottle-shaped container of synthetic resin according to the present invention carries out the sandblasting step on a small preformed piece, it requires small space of facility for performing the same step to be economical and further advantageously achieves the masking extremely easily at the sandblasting step by using small rectilinear tubular preformed piece in case, for example, for manufacturing the bottle-shaped container having a partially frosted or ground pattern surface.

It should also be appreciated that since the method of manufacturing the bottle-shaped container according to the present invention sandblasts the outer surface of the preformed piece to thereby form a sharp coarse frosted or ground rugged surface thereon and performs the steps of biaxially orienting to expand the preformed piece of the state heated to the orienting temperature within the mold having a smooth inner wall surface and making the outer peripheral wall surface of the preformed piece close contact with the inner smooth wall surface of the mold to thereby biaxially orient it, it can transform the sharp coarse rugged surface into extremely fine shallow flattened rugged surface to thereby provide soft and warm sense of touch together with frosted or ground glass-like elegance on the bottle-shaped container readily by adding very simple step of sandblasting the preformed piece to the conventional method of manufacturing the bottle-shaped container of synthetic resin.

Figure 8:
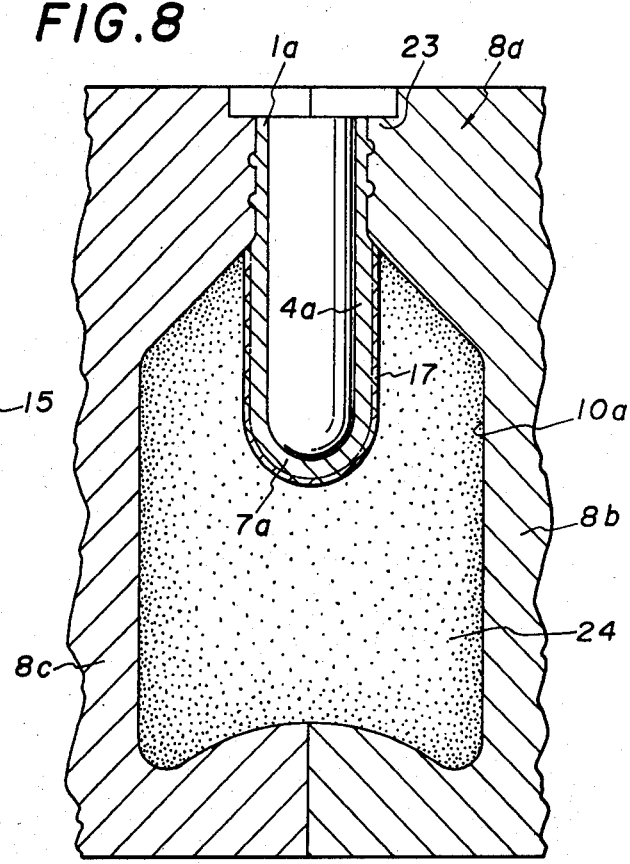
FIG. 8 is a vertical sectional view of the mold for blow-molding the preformed piece inserted thereinto into a bottle-shaped container of another preferred embodiment of this invention.

Referring to FIG. 8 showing a modified preferred embodiment of the method of manufacturing the bottle-shaped container according to the present invention, the other preferred embodiment of the method of manufacturing the bottle-shaped container which was heretofore described with reference to FIGS. 5 and 6 will now be described below.

This method comprises a first step of injection-molding a substantially amorphous transparent preformed piece or parison 7a opened at the top with a bottom from synthetic resin such as saturated polyester (not shown).

This method also comprises a second step of heating the preformed piece 7a from its outer periphery by means of heat source such an an infrared ray heater, a block heater, etc. to crystallize the surface and preferably the outer layer portion 17 of approx. 1 mm in depth from the surface to thereby opacify it in white or milky white. The heating temperature in this step is selected, as was heretofore described with respect to the preferred embodiment of the crystallized bottle-shaped container with reference to FIGS. 5 and 7, from the temperature ranges from the temperature below 20° C. from the melting point of the saturated polyester above the crystallization temperature of the polyester at the surface temperature of the preformed piece 7a, and the temperature and heating period are so selected, similarly described heretofore to the above, for example, as to crystallize the outer layer portion 17 of approx. 1 mm in depth from the surface of the preformed piece or parison having means density of the polymer of the ranges from 1.345 to 1.375.

The method also comprises third step of inserting the preformed piece 7a into a mold 8a to blow-mold the preformed piece 7a at the temperature capable of performing the biaxial orientation or expansion of the preformed piece 7a.

The mold 8a thus used consists, as shown in FIG. 8, of split molds 8b, 8c constructed to hold the neck portion 1a of the preformed piece 7a at its inlet portion 23, and blow-molds the cylindrical portion 4a of the preformed piece 7a except for the neck portion 1a so that the cylindrical portion 4a makes close contact with the inner surface 10a of the cavity 24 thereof.

The mold 8a is formed with rough pattern of fine rugged surface by means of sandblasting process or the like on the inner surface 10a thereof to thereby form rough pattern of fine rugged surface on the outer surface 19 of the bottle-shaped container body 15 making close contact with the inner surface 10a of the cavity 24 thereof as in the previous step to obtain a pear skin-like rough surface.

It is noted that although the bottle-shaped container body 15 thus manufactured according to this invention is formed with the rough surface entirely from the shoulder 20 to the bottom 21 thereof, it may also be partially formed with the rough surface, for example, on the upper half surface, on the central surface, or on the lower half surface thereof readily by the steps of shielding the portion of the surface unnecessary to form the rough or pearl-like surface with a heat insulator when crystallizing the performed piece 7a to capacify it in white or milky white to thereby prevent the unnecessary portion of the surface from opacifying or whitening and forming the rough pattern of fine rugged surface only on the portion necessary to form the rough or pearl-like surface on the inner surface 10a of the mold 8a.

It is noted that in the bottle-shaped container of synthetic resin having rough or pearl-like ground surface and method of manufacturing the same of the present invention a coloring agent such as pigment or the like may be added when injection-molding the preformed piece of saturated polyester used therefor to present desired color tone on the preformed piece to thereby exhibit peculiar external appearance together with the aforementioned pearl-like ground surface in color tone imparted by the coloring agent.

It should be understood from the foregoing description that since the bottle-shaped container and the method of manufacturing the same according to the present invention are thus constructed, the bottle-shaped container thus manufactured incorporates pearl-like gloss on desired surfaces thereof without addition of any material for presenting the pearl-like gloss thereto instead of glossy surface peculiar to synthetic resin to thereby form a superior light rays' irregular reflective rough surface together with an entirely new decorative effect without losing any advantageous properties of the synthetic resin.

It should also be appreciated that since the bottle-shaped container and the method of manufacturing the same according to the present invention are thus constructed by forming the rough pattern of fine rugged surface in advance on the inner surface of the cavity of the mold for blow-molding the bottle-shaped container as required and heating to blush or whiten the necessary portion of the preformed piece of saturated polyester, the method can mold the bottle-shaped container having the pearl-like ground surface by the entirely same steps and productivity as the ordinary blow-molding process sanitarily without necessity of any foreign material for presenting the pearl-like gloss.

What is claimed is:

1. A method of producing a bottle shaped container of synthetic resin having at least a partial outer layer portion with a rugged surface and thermally crystallized to have a whitened or blushed surfaced comprising the steps of:

injection molding a preformed piece of saturated polyester;

sandblasting the outer surface of said preformed piece until a rugged surface is formed thereon;

heating the outer layer portion of the preformed piece to thereby crystallize the outer layer portion to opacify it in white, the heating temperature being selected from the temperature range of from about 20° C. below the melting point of saturated polyester to the crystallization temperature of the polyester at the surface temperature of the preformed piece, the temperature and heating period being so selected as to crystalline the outer layer portion to substantially 1 mm in depth from the surface of the preformed piece, said piece having a mean density of the polymer within the range of from 1.345 to 1.375;

placing the crystallized preformed piece heated to orientation temperature, in the range from the glass transition temperature of the saturated polyester forming the preformed piece to the melting point thereof, into a blow mold;

biaxially orienting the crystallized preformed piece in the blow mold by blowing compressed air internally into the piece and simultaneously pushing down on a push rod in the piece thereby forming a bottle shaped container;

heat-setting the bottle shaped container wherein the outer peripheral wall surface of the piece makes contact with the inner surface of the mold, for at least 5 seconds;

cooling the bottle shaped container, immediately after the heat-setting step;

unloading the bottle shaped container from the mold;

matte coating the outer layer of the bottle shaped container with a mixture comprising colored pigment, low boiling point solvent, and powder silicon oxide to produce a colored opaque container with a rugged outer surface.

2. A method according to claim 1 further comprising the step of applying the matte coating on the surface of the bottle shaped container in a thickness not to disturb the transmission of light rays therethrough.

3. A method of producing a bottle shaped container of synthetic resin having at least a partial outer layer portion thermally crystallized to be opacified in white comprising the steps of:

injection molding a preformed piece of saturated polyester;

partially sandblasting the outer surface of said preformed piece by shielding a portion of the surface during sandblasting thereby forming a partially rugged surface thereon;

heat shielding the portion of the outer surface of said preformed piece without the sandblasted surface;

heating the outer layer portion of the preformed piece to thereby crystallize the outer layer portion to opacify it in white, the heating temperature being selected from the temperature range of from about 20° C. below the melting point of saturated polyester to the crystallization temperature of the polyester at the surface temperature of the preformed piece, the temperature and heating period being so selected as to crystallize the outer layer portion to substantially 1 mm in depth from the surface of the preformed piece, said piece having a mean density of the polymer within the range of from 1.345 to 1.375;

placing the crystallized preformed piece heated to orientation temperature, in the range from the glass transition temperature of the saturated polyester forming the preformed piece to the melting point thereof, into a blow mold;

biaxially orienting the crystallized preformed piece in the blow mold by blowing compressed air internally into the piece and simultaneously pushing down on a push rod in the piece thereby forming a bottle shaped container;

heat-setting the bottle shaped container wherein the outer peripheral wall surface of the piece makes contact with the inner surface of the mold for at least 5 seconds;

cooling the bottle shaped container immediately after the heat setting step;

unloading the bottle shaped container from the blow mold;

coating the outer layer of the bottle shaped container with a mixture comprising colored pigment low boiling point solvent, and powder silicon oxide to produce a colored opaque container with a rugged outer surface.

4. A method according to claim 3, further comprising the step of applying the matte coating on the surface of the bottle shaped container in a thickness not to disturb the transmission of light rays therethrough.

* * * * *